United States Patent
Firley et al.

(10) Patent No.: US 8,015,274 B2
(45) Date of Patent: Sep. 6, 2011

(54) AUTOMATED VALIDATION OF PERIPHERAL DIRECTOR HARDWARE

(75) Inventors: Mark J. Firley, Gaithersburg, MD (US); Phillip C. Arnett, Raleigh, NC (US); Roland M. Foster, Fayetteville, PA (US); Robert G. Warner, Cary, NC (US); Scott W. Wood, Monrovia, MD (US)

(73) Assignee: International Business Machines Corporation, Armonk, NY (US)

( * ) Notice: Subject to any disclaimer, the term of this patent is extended or adjusted under 35 U.S.C. 154(b) by 410 days.

(21) Appl. No.: 11/685,451

(22) Filed: Mar. 13, 2007

(65) Prior Publication Data

US 2008/0225849 A1  Sep. 18, 2008

(51) Int. Cl.
*G06F 15/16* (2006.01)
*G06F 15/173* (2006.01)
*H04L 12/50* (2006.01)
*H04Q 11/00* (2006.01)

(52) U.S. Cl. ........ 709/223; 709/202; 709/224; 709/250; 370/358

(58) Field of Classification Search .......... 709/202, 709/223, 224, 250; 370/358
See application file for complete search history.

(56) References Cited

U.S. PATENT DOCUMENTS

| | | | | |
|---|---|---|---|---|
| 6,243,862 | B1 * | 6/2001 | Lebow | 717/131 |
| 6,591,417 | B1 * | 7/2003 | Strysniewicz et al. | 717/168 |
| 2002/0133807 | A1 * | 9/2002 | Sluiman | 717/124 |
| 2004/0068677 | A1 | 4/2004 | Briskey et al. | |
| 2005/0193291 | A1 | 9/2005 | Subramanian et al. | |
| 2006/0059253 | A1 * | 3/2006 | Goodman et al. | 709/223 |
| 2007/0101016 | A1 * | 5/2007 | Boyd et al. | 709/238 |
| 2007/0189196 | A1 * | 8/2007 | Miller et al. | 370/315 |

* cited by examiner

*Primary Examiner* — Yemane Mesfin
*Assistant Examiner* — Farrukh Hussain
(74) *Attorney, Agent, or Firm* — Douglas Lashmit; Hoffman Warnick LLC

(57) ABSTRACT

A system and method of automating the validation and control of peripheral director hardware in a switched fabric network. A system is provided that includes a script language processor for interpreting high-level statements and generating command functions understood by an application programming interface (API) associated with the switched fabric network, wherein the command functions include a query switch command, a query interface switch command, a write switch command, and a display result command; and a system for generating an output in response to a set of command functions submitted to the switched fabric network.

21 Claims, 3 Drawing Sheets

| Port Logical Name | The logical name of the port, or blanks if no name has been assigned |
|---|---|
| Pt | The port address (hexadecimal, 00-FF). This is the address by which the port is "known" externally. |
| No | The port number (hexadecimal, 00-FF). The is the sequentially numbered position within the array of implemented ports. |
| All | The number of ports to which the current port is allowed. |
| Hdw | Port hardware type:<br>    (blank) ..... unspecified        int .......... internal<br>    ele .......... electrical          LED .......... LED fiber<br>    Las .......... laser fiber        101 .......... reserved<br>    110 .......... reserved         111 .......... reserved |
| Tech | Transceiver technology (applies when hardware type is Las):<br>    (blank) ..... unspecified<br>    GSM .......... short wave multimode<br>    GLS .......... long wave single-mode<br>    GLX .......... long wave mixed-mode<br>    100 .......... laser fiber        101 .......... reserved<br>    110 .......... reserved         111 .......... reserved |
| Prcl | Protocol type:<br>    ESCON ..... ESCON           001 .......... reserved<br>    Fbrdg ..... FICON bridge    Ffabr ..... FICON fabric<br>    FE-pt ..... FICON E-port    FL-pt ..... FICON L-port<br>    FG-pt ..... FICON G-port    111 .......... reserved |
| Sp | Sp ..................... spare (swapped) port |
| SC | pp ..................... static connection port address |
| Of | Of ..................... port is offline |
| Bl | Bl ..................... port is blocked |
| LF | LF ..................... link failure |
| Mt | Mt ..................... maintenance mode |
| Sv | Sv ..................... service required |
| IA | IA ..................... invalid attachment |
| EE | EE ..................... error threshold exceeded |
| NU | NU ..................... port number not usable |
| DCM | DE ..................... DCM eligible<br>DA ..................... DCM eligible and allowed |
| Chain/Bridge | C ssss pp ........... port is chained to director ssss port pp<br>C ssss pp MP .... port is midport in specified chain<br>C Midport ....... port is midport in some defined chain<br>B BP ................. port is a bridge port<br>B BP Dg .......... port is a bridge port, degraded<br>B BP Off ........ port is a bridge port, held offline |

FIG. 2

```
CHECK OUT NEW DIRECTOR OPERATION                 2 Feb 2006 10:48:41    Page    1
Test QSW SUMMARY Seq Test Script Statement
**  *  **********************************************************************
0001   1   IDENT Test QSW SUMMARY
0002   1   QSW   007B SUMMARY QUERY SWITCH 007B SUMMARY       Number Addresses
Control Unit Port (CUP).........   FE
Implemented Ports...............  254  00-FD
Installed Ports.................  224  00-DF
Ports with Logical Names........  153  00-08,0A-10,12-18,1A-20,22-28,2A-2F,33,35,37,3B,3D,3F-
48,4A-4F,53,55-57,5B,5D-5F,
                                       63,65-67,6B,6D-6F,73,75-77,7B,7D-80,82-83,85-86,88,8A-
8B,8D-8E,90,93,95-98,9B,
                                       9D-A0,A2-A8,AA-B0,B2-B8,BA-C0,C2,C4-C8,CA-
CB,CD,CF,D3,D5,D7,DB,DD,DF
Ports with Allow(s).............   64
02,0B,0F,18,22,2A,43,46,4D,53,5E,6B,80,83,86,88,8B,8E,90,93,95-98,9B,9D-A0,A2-A8,
                                       AA-B0,B3,B5,B7-B8,BB-BD,BF-C0,C4-
C5,C8,CB,CD,CF,D3,D5,D7,DB,DD,DF
Ports with Prohibit(s)..........  254  00-FD
Ports Offline...................   92  09,11,18-19,1D,21,29,30-32,34,36,38-3A,3C,3E-3F,49,4B,50-
52,54,58-5A,5C-5D,60-62,
                                       64,68-6A,6C,70-72,74-75,77-7A,7C,81-82,84-85,87,89-8A,8C-
8D,8F,91-95,97,99-9D,
                                       9F,A1,A9,B1,B3,B5,B7,B9,C1,C3,C7,C9,CC,CE,D0-D2,D4,D6,D8-
DA,DC,DE
Ports Blocked...................    0
Ports with Errors...............    0
```

FIG. 3

AUTOMATED VALIDATION OF PERIPHERAL DIRECTOR HARDWARE

FIELD OF THE INVENTION

The invention relates generally managing complex switching fabrics, and more particularly to a system and method of automating the validation and control of peripheral director hardware in a switched fabric network.

BACKGROUND OF THE INVENTION

In large complex information technology (IT) infrastructures, challenges exist in controlling and testing what is referred to as a "switched fabric" or "switched fabric network." A switched fabric is a computer network topology where many devices connect with each other via switches (also referred to herein as switching points, nodes or directors). Switched fabric networks are different from typical hierarchical switched networks (e.g., Ethernet) in that switched fabric networks naturally support redundant paths between multiple devices, forming a mesh network with devices being on the "edges" of the mesh. One of the advantages of this topology is failover, meaning that in case one link breaks or a switch is out of order, datagrams (e.g., packets) can traverse alternate paths. Another is scalability, meaning that more switches can be added as the number of endpoints increases so the route length (and thus, latency and throughput) can remain constant for point-to-point datagrams.

One of the challenges in implementing and maintaining a switched fabric is the fact that many different devices must be able to talk to each other via the various switching points. Accordingly, there are many possible states for all of the switching points, which make configuring the switched fabric error prone. Currently, there exist no automated solutions for controlling and testing switched fabric networks.

SUMMARY OF THE INVENTION

The present invention addresses the above-mentioned problems, as well as others, by providing system and method of automating the validation and control of peripheral director hardware in a switched fabric network.

In a first aspect, the invention provides a director control system for controlling directors in a switched fabric network, comprising: a script language processor for interpreting high-level statements and generating command functions understood by an application programming interface (API) associated with the switched fabric network, wherein the command functions include a query switch command, a query interface switch command, a write switch command, and a display result command; and a system for generating an output in response to a set of command functions submitted to the switched fabric network.

In a second aspect, the invention provides a computer program product stored on a computer readable medium for controlling directors in a switched fabric network, comprising: program code for interpreting high-level statements and generating command functions understood by an application programming interface (API) associated with the switched fabric network, wherein the command functions include a query switch command, a query interface switch command, a write switch command, and a display result command; and program code for generating an output in response to a set of command functions submitted to the switched fabric network.

In a third aspect, the invention provides a method of controlling directors in a switched fabric network, comprising: providing a set of high-level statements for controlling at least one node in the switched fabric network; processing the high-level statements and generating command functions understood by an application programming interface (API) associated with the switched fabric network, wherein the command functions are selected from the group consisting of: a query switch command, a query interface switch command, a write switch command, and a display result command; submitting the command functions to the switched fabric network via the API; and generating an output in response to the command functions submitted to the switched fabric network.

In a fourth aspect, the invention provides method for deploying director control system for controlling directors in a switched fabric, comprising: providing a computer infrastructure being operable to: interpret high-level statements and generate command functions understood by an application programming interface (API) associated with the switched fabric network, wherein the command functions include a query switch command, a query interface switch command, a write switch command, and a display result command; and generate an output in response to a set of command functions submitted to the switched fabric network.

BRIEF DESCRIPTION OF THE DRAWINGS

These and other features of this invention will be more readily understood from the following detailed description of the various aspects of the invention taken in conjunction with the accompanying drawings in which:

FIG. 2 depicts a table showing column headings for a report in accordance with an illustrative embodiment of the present invention.

FIG. 3 depicts a report in accordance with an illustrative embodiment of the present invention.

DETAILED DESCRIPTION OF THE INVENTION

Figure 1:
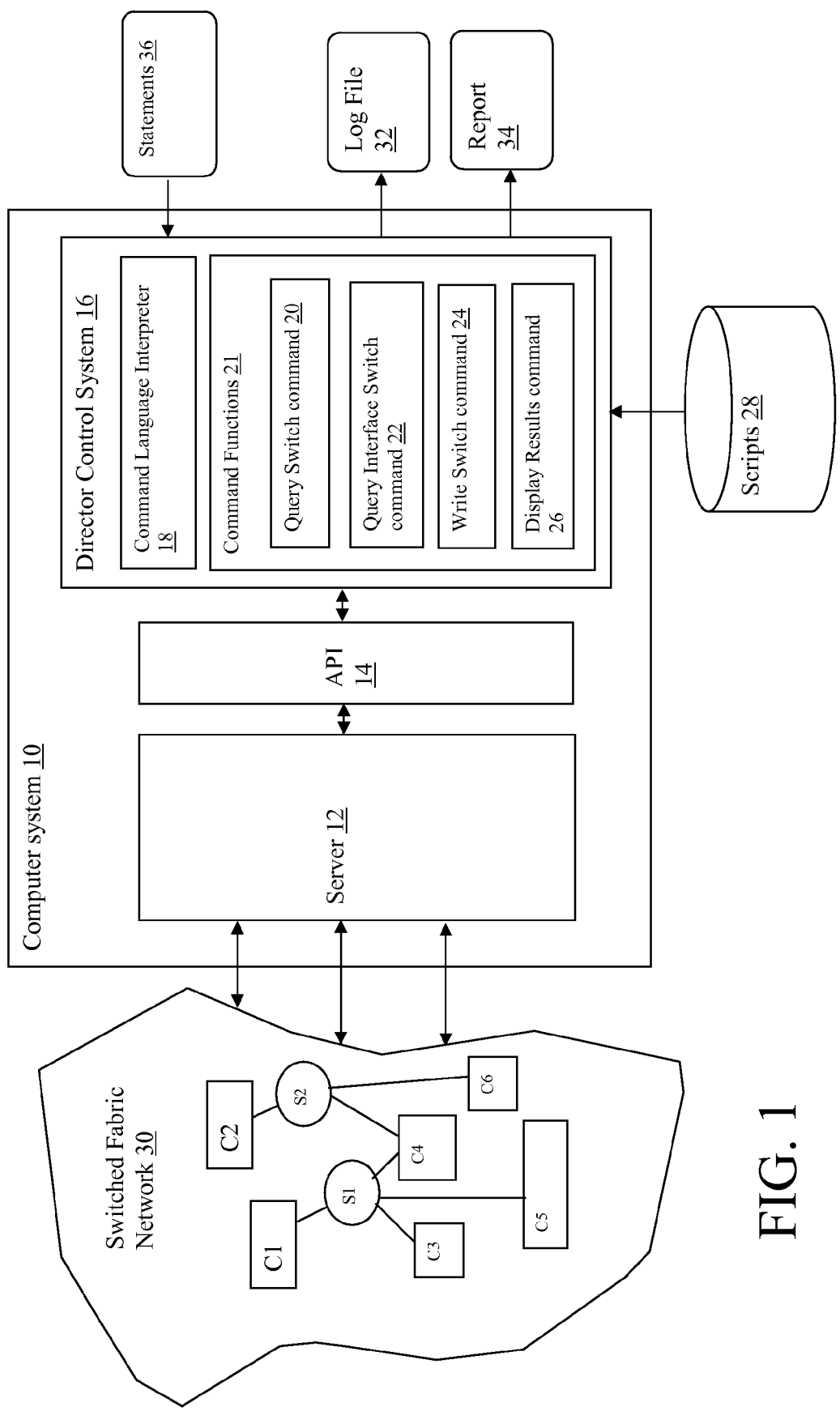
FIG. 1 depicts a switched fabric network that is controllable by director control system in accordance with an illustrative embodiment of the present invention.

Referring now to drawings, FIG. 1 depicts a switched fabric network 30 comprising various components (e.g., C1-C6) and switching points or directors (e.g., S1-S2). Generally speaking, each director includes an addressable port that can be manipulated by one or more commands defined by an application programming interface (API) 14 associated with the switched fabric network. Coupled to switched fabric network 30 is a computer system 10 that includes a server 12, application programming interface (API) 14 and a director control system 16. Director control system 16 provides a mechanism through which high-level statements 36 or scripts 28 can be processed and converted into a set of API-specific commands. This thus allows switched fabric network 30 to be more easily controlled, i.e., set up, tested, interrogated, etc.

Director control system 16 includes a script language processor 18 that interprets "high level" statements 16 or scripts 28; and generates a set of command functions 21 to allows director control system 16 to interface with the switching points (e.g., S1-S2) and ports in the switch fabric network 30 via API 14 and server 12. In particular, director control system 16 allows a user, script, other program or system, etc., to set up, test, and interrogate switched fabric network 30 without extensive manual labor.

In one illustrative embodiment, director control system 16 is implemented as a REXX program that runs under z/OS and uses the API 14 of System Automation for z/OS to exercise ESCON and FICON directors. In the embodiment shown in FIG. 1, director control system 16 can issue four command functions 21 via API 14. The command functions 21 include Query Switch command 20, Query Interface Switch command 22, Write Switch (Writeswch) command 24, and Display Results command 26. These command functions 21 are generated by script language processor 18 in response to a set of statements 36 or script 28 written in a high-level script language described below.

Director control system 16 may be implemented as a program that runs as a batch job. Its input may consist of one ore more command scripts 28, telling director control system 16 what to do with which directors and ports. Each command script 28 may comprise one or more tests that consist of one or more commands to query a director, check for certain errors, and/or modify a port definition or status. In an alternative embodiment, input may consist of statements 36, e.g., entered via a user interface or from another program.

Output of director control system 16 output consists of a log file 32 and a report 34. Log file 32 contains every bit of data sent to or received from each director, which is useful for bit-level analysis if something does not work. Report 34 shows, for each test, the script statements that define the test, any error messages that are produced, and any information that is produced in response to the input, e.g., command script 28. Extensive error checking is performed, and all errors are reported. This even includes such things as a reserved bit being nonzero in a query response. Report 34 presents a detailed record of each test, what it was trying to do, and what it did.

Command Functions

As noted, an existing control API 14 includes predefined commands for interfacing with directors and ports in a switched fabric network 30. In this illustrative embodiment, the commands are as follows:

Query Switch command 20 returns a response block consisting of, e.g., 256 80-byte records, one for each possible port address allowed by the director architecture. These records contain definition and status information about each port. Query Switch command 20 is used to investigate the state of a director, e.g., determining what components are behind the director, and what the status of the director is. For example, Query Switch command 20 can be used to investigate whether data can flow to a component, whether there are any logical or physical faults, etc.

Query Interface Switch command 22 is similar, but returns more data, e.g., 360 bytes for each of the 256 possible port addresses. Query Interface Switch command 22 can be used to query all details associated with a director, and is utilized, for instance, when detailed diagnostics are required.

Writeswch command 24 sends a variable number of, e.g., 80-byte records to the director, each one of which can effect one or more changes, e.g., changing the port's logical name and/or how it is switched to other ports, etc. Writeswch command 24 is thus utilized to alter the status of a director, for example turning it on or off, etc.

Display Results command 26 is only used when an error occurs on a Writeswch command 24. Display Results command 26 asks the API 14 to provide further details about the error.

Status information about a director can for instance be determined by analyzing entries in the port associated with the director. For example, a first predefined bit in a port's entry obtained in the response to a Query Switch command 20 or Query Interface Switch command 22 indicates whether or not that port is implemented. Similarly, a second predefined bit in a port's entry obtained in the response to a Query Switch command 20 or Query Interface Switch command 22 indicates whether or not that port is installed.

A Prohibit Dynamic Connection Mask (PCDM), or "dynamic mask", is also defined that provides a 256-bit control string that is implemented for each port within a director. Each bit corresponds to a port address (00-FF). If the bit is "1", dynamic connections with the corresponding port are "prohibited"; if it is "0" dynamic connections are "allowed".

Script Language

Script language processor 18 may be implemented in any manner to generate commands understood by API 14, and generally is implemented to allow for high-level statements that can be readily understood by a user. The following is an example of a set of such statements, where an asterisk (*) denotes a comment, and a plus sign (+) in the first column indicates an operation that is to be performed within the same Writeswch record as the previous operation (hence it must operate on the same port).

```
IDENT Test 114-2042 7D Mod 256 Ser 13123B8 Addr 007D
* This is a comment line with supplementary or
*    descriptive information about this test.
  NAME 007D.1D 2105SJ99.1.3.2        * rename port 1D
+ MASK-C 007D.1D            * replace PDCM; prohibit all ports
```

In this example, IDENT is used to identify a test being performed, NAME is used to rename a port, and MASK-C replaces a mask associated with a port.

Listed below describe the various statement types supported by an illustrative embodiment of the script language processor 18. Note that "address" below means the 4-digit device address of the director; and "port" indicates a 2-digit hexadecimal port address. An italicized word indicates that the word should be replaced by some value. Items within curly braces ({ . . . }) are optional.

Comment

A Comment statement is identified by an asterisk in the first column. Comments are copied to the report data set, but are otherwise ignored. Also, in any other script statement, an asterisk, along with everything that comes after it, is a comment. A completely blank line is also treated as a comment.

IDENT {text}

IDENT is a required statement that identifies each test that is being performed. All statements following an IDENT statement, down to but not including the next IDENT, constitute one test definition. The IDENT statement contains "IDENT" as the first word. Any text following the word "IDENT" is reproduced as an identifier on the second line of each report page for that particular test. This will typically be the type, model and serial number of the director being tested, and/or something about the purpose of the test.

QSW address option

QSW performs a Query Switch command 20. The options include:

SUMMARY—summarizes the information obtained from the director

LIST—reports one line of information for each port

FULL—reports additional detail for each port.

QIS address option

QIS performs a Query Interface Switch command 22, which produces essentially the same information as QSW, plus node descriptors and node element descriptors. The options include:

SUMMARY—summarizes the information obtained from the switch

LIST—reports the essential information for each port

FULL—reports the complete information obtained.

ASYM address

This function uses a Query Switch command 20 to check a director for asymmetric prohibit/allow conditions; i.e., any situation in which port A is allowed to port B, but port B is prohibited to port A. This unusual error condition has been known to occur.

The following commands may be batched together in the same WRITESWCH block until a logical limit is reached or until a BREAK command is encountered.

MASK-A address.port {TO} port1{, port2, port3, ... }

This uses the "And PDCM" function of the Writeswch command 24 to allow the primary port to the specified set of secondary ports. If the primary port is also among the secondary ports, it will be allowed to itself (if the hardware allows it). A secondary port can also be a range of hex addresses, e.g. "44-4C". Use "all" to allow the primary port to all implemented ports.

MASK-P address.port {TO} port1{, port2, port3, ... }

This uses the "Or PDCM" function of the WRITESWCH command to prohibit the primary port to the specified set of secondary ports. If the primary port is also among the secondary ports, it will be prohibited to itself. A secondary port can also be a range of hex addresses, e.g. "44-4C". Use "all" to prohibit the primary port to all implemented ports (except the Control Unit Port (CUP)).

MASK-C address.port {TO} port1{, port2, port3, ... }

This uses the "Modify PDCM" function of the WRITESWCH command to replace the prohibit mask with a new mask that will allow the primary port only to the specified set of secondary ports. If the primary port is also among the secondary ports, it will be allowed to itself (if the hardware allows it). A secondary port can also be a range of hex addresses, e.g., "44-4C". Use "all" to allow the primary port to all implemented ports.

NAME address.port newname

Replace the port logical name with the specified new name. If newname is omitted, any existing port name will be removed.

BLOCK address.port

Change the port's status to "blocked".

UNBLK address.port

Change the port's status to "unblocked".

Reports

As noted, reports provide details relating to the running of a test. An example of a report is shown in FIG. 3. Each report 34 may include a heading, such as:

| CHECK OUT NEW DIRECTOR OPERATION | 2 Feb 2006 10:48:41 |
|---|---|
| Page 1 | |
| Test QSW SUMMARY | |

Below the heading, the statements for that test are listed, beginning with the IDENT statement. Each line of this listing contains a statement sequence number in the first field, followed by the number assigned to the particular test, and then the full text of the script statement. For example:

| Seq | Test | Script Statement |
|---|---|---|
| 0001 | 1 | IDENT Test QSW SUMMARY |
| 0002 | 1 | QSW 007B SUMMARY |

The other fields on the report are specific to the type of test being run.

Query Switch (Summary)

The QSW Summary Report consists of several descriptive phrases, along with the number and addresses of ports to which each description applies. The descriptive phrases and their meanings are as follows:

| | |
|---|---|
| Control Unit Port (CUP) | The address of the Control Unit Port (always FE) |
| Implemented Ports | All port addresses that are implemented on the particular model of the current director. |
| Installed Ports | Ports that currently have port card hardware installed |
| Ports with Logical Names | Ports with non-blank, non-null logical name fields |
| Ports with Allow(s) | Ports that are allowed to at least one other port |
| Ports with Prohibit(s) | Ports that are prohibited to at least one other port |
| Ports Offline | Ports with "offline" status indicated |
| Ports Blocked | Ports with "blocked" status indicated |
| Ports with Errors | Ports with some kind of error status indicated |

After each phrase there appears the number of ports in that category, then a list of the individual port addresses of those ports. For example:

| QUERY SWITCH 007B SUMMARY | Number | Addresses |
|---|---|---|
| Control Unit Port (CUP) | | FE |
| Implemented Ports | 254 | 00-FD |
| Installed Ports | 224 | 00-DF |
| Ports with Logical Names | 153 | 00-08, 0A-10, 12-18, 1A-20, 22-28, ... |

Query Switch (List) and Query Interface Switch (List)

Each of these reports consists of a table, of which each row represents either one installed port in the director, or a sequence of consecutive uninstalled ports. The columns of the table are identified by a column heading line. Illustrative column headings, and their meanings are shown in a table in FIG. 2.

Query Interface Switch "Base" Fields

Certain basic information about the director is presented at the beginning of each of the QIS reports. This information is in two parts. On the left is an array of status information, while at the right two of the node descriptor fields of the QIS response are interpreted. For example:

| Response from THIS-SYS on system WSCPLEX of sysplex WSCMVS (return/reason code 0) | |
|---|---|
| Switch Address | 007C Valid? YES |
| Switch In I/O-OPS database? | NO |
| Switch Opened by I/O-OPS? | YES |
| Logical Switch No | 7C Valid? YES |
| Control Unit Port (CUP) | FE |

-continued

| Response from THIS-SYS on system WSCPLEX of sysplex WSCMVS (return/reason code 0) | |
|---|---|
| Operational status | operational |
| Error code | 0 |
| Implemented Ports (NPIM) | 255 |
| Installed ports (NPINST) | 241 |

First, this indicates the QIS response came from the current system, without error. All of the remaining information comes from the first valid record of the response. The address of the director is shown, and the address-valid flag. In this case the director is not in the I/O-OPS data base, but it has been opened by I/o-OPS and its logical switch number (originally from the IOCP) is shown. The CUP (always) is "FE"; the switch is operational, with no errors; and the counts of implemented and installed ports are shown.

| Description | SNI | Typ | Class | L | Mach | Mdl | Mfr | Plant | Serial | Tag |
|---|---|---|---|---|---|---|---|---|---|---|
| NED | SN | Dev | Switch | 1 | FC9000 | 256 | CNT | NJ | 0060DF006BC8 | 0000 |

| Description | | St | Class | Lk | Mach | Mdl | Mfr | Plant | Serial | Tag |
|---|---|---|---|---|---|---|---|---|---|---|
| Unique Physical ID | | ok | Switch | | FC9000 | 256 | CNT | NJ | 0060DF006BC8 | 0000 |

These are two of the several "node descriptor" entries in the QIS response records, and they both apply to the switch itself. Both show (in this case) that the director is a CNT FC9000 model 256 made at a plant identified as "NJ", and having the serial number shown. The first of the two entries is a Node Element Descriptor, because the director itself is a node element (device) rather than a node (control unit for other devices). This is also indicated by the Typ value of "Dev", rather than "CU". The device class value shows that it is a "switch" and the serial number indicator says that the serial number shown is the actual serial number of the box. The value in the column labeled L can be "1", indicating that this NED is not related to the next one retrieved, or "0", indicating that it is not. In the second node descriptor, the St field is a status indicator, and the Lk field applies only to a converter.
Query Interface Switch (Summary)

Like the QSW Summary Report, the QIS Summary Report consists of several descriptive phrases, along with either a status value or the number and addresses of ports to which each description applies.
Messages The director control system 16 may include the ability to generate various messages in response to an inputted set of statements. Below is an illustrative list of such messages.
CDO001I Error reading Script data set.
An I/O error occurred while reading the Script data set. Check the JCL and the data set attributes.
CDO002I I/O-OPS is down—must be restarted.
The I/O Operations component of System Automation is not running. Have the operator restart the procedure.

| CDO003E | iooprn addr failed. IHVRC = cc IHVREAS = xxxxxxxx. |
| CDO004E | IHVmsg. |
| CDO005E | IHVmsg. |

The indicated operation iooprn (QUERY SWITCH or WRITESWCH) to director addr failed, with a return code of cc and a reason code of xxxxxxxx. Further information is usually provided by I/O-OPS in the next one or two IHV messages.
CDO006I Error writing the Log data set.
An I/O error occurred while writing the Log data set. Check the JCL and the data set attributes.
CDO007I IHVmsg
This shows information from an I/O-OPS DISPLAY RESULTS function, following an error on another I/O-OPS call. This should help determine what went wrong. Much of the superfluous information has been discarded (for example, a statement that the command was not sent to a different, uninvolved switch).
CDO100I Columns 1-2 must be blank for IDENT statement.
The first two columns of an IDENT statement must be blank.
CDO101I Columns 1-2 must be blank or '*' or '+'.
The first two columns of all statements must be blank, except comments (which have an asterisk in column 1) and a statement to be combined with the previous one (which has a plus sign in column 1).
CDO111I The director address must be 4 hexadecimal characters.
A four-character hexadecimal director address is required.
CDO112I Specify ONE option operand: SUMMARY, LIST, or FULL.
One, and only one, option is required for the QSW or QIS statement.

| CDO113I | The only valid option operands for QIS or QSW are SUMMARY, LIST, and FULL. |

An invalid option was specified.
CDO114I Extraneous information: xxxx
Extraneous information was found after the statement operands. If this is meant to be comments, precede it with an asterisk.
CDO115I Specified name contains an invalid character.
A port logical name must consist of only upper case alphabetic characters, numerals, and these special characters: : .- _ @ # $. Imbedded spaces are not allowed, though trailing spaces are, of course.

| CDO120I | The optional word 'TO', if used, must come between the primary and secondary ports. |

The word "TO" is misplaced in the statement.
CDO121I A port address must be 2 hexadecimal characters.
A port address either was not two characters long or contained a character that was not a hexadecimal digit (0-F).

| | |
|---|---|
| CDO122I | MASK-A and MASK-P commands require at least one secondary port. |

The port(s) to which the specified port is to be allowed must be specified.

CDO123I The specified port is not implemented on director addr.

A port address was specified that is outside the implemented ports range for this director.

| | |
|---|---|
| CDO124I | 'TO' ports must be one or more 2-digit hex port addresses or ranges, e.g. '05, 12-1E'. |

Something other than the expected port addresses was found in the statement.

CDO128I Invalid statement type.

This is not recognized as a valid statement type.

CDO131I Query command may not be combined with another.

Only commands that use the WRITESWCH function can be combined.

| | |
|---|---|
| CDO132I | Sequence error - NAME command may only be combined with a preceding MASK and/or BLOCK/UNBLK. |

An attempt was made to combine a NAME statement with a preceding statement that was not a MASK-x or BLOCK or UNBLK statement.

| | |
|---|---|
| CDO133I | Sequence error - MASK command may only be combined with a preceding NAME and/or BLOCK/UNBLK. |

An attempt was made to combine a MASK-x statement with a preceding statement that was not a NAME or BLOCK or UNBLK statement.

| | |
|---|---|
| CDO134I | Sequence error - BLOCK/UNBLK command may only be combined with a preceding NAME and/or MASK. |

An attempt was made to combine a BLOCK or UNBLK statement with a preceding statement that was not a NAME or MASK-x statement.

| | |
|---|---|
| CDO135I | Only a NAME, MASK, or BLOCK/UNBLK command may be combined with another command. |

There is a plus sign in column 1 of a statement that cannot be combined with a previous statement.

CDO136I Combined commands must be for the same director and port.

A command to be combined with the previous command must specify the same director address and port address as the previous command.

| | |
|---|---|
| CDO201I | QSW connect bit (byte 8 bits ...x...) must be zero for a FICON director. |
| CDO 202I | QSW static connection port (byte 14) must be zero for a FICON director. |

FICON directors do not support static connections. Therefore, the static connection port and the "connected" flag should both be zero.

CDO203I QSW record format (byte 0 bits . . . xx . . . ) must be '00'.

The only record format currently supported by I/O Operations is '00'.

| | |
|---|---|
| CDO 204I | QSW reserved bits (byte 0 bits ...xxxx) must be zero. |
| CDO 205I | QSW reserved bits (byte 1 bits xxxxxx..) must be zero. |
| CDO 206I | QSW reserved byte (byte 4) must be zero. |
| CDO 207I | QSW reserved byte (byte 7) must be zero. |
| CDO 208I | QSW reserved bit (byte 8 bit ...x...) must be zero. |
| CDO 209I | QSW reserved bits (byte 10 bits ...xx...) must be zero. |
| CDO 210I | QSW reserved bit (byte 12 bit ...x...) must be zero. |
| CDO 211I | QSW reserved byte (byte 12) must be zero. |
| CDO 212I | QSW reserved byte (byte 15) must be zero. |
| CDO 213I | QSW reserved byte (byte 79) must be zero. |

In the IHVRESP records returned by the QUERY SWITCH command, the specified bytes or bits are "reserved," which means they cannot be used, and thus must be zero. You should consult the latest *System Automation for z/OS Programmer's Guide* to see if the specified bytes or bits are no longer reserved.

CDO801I Results of the WRITESWCH command were as expected.

A WRITESWCH call was executed. A QUERY SWITCH was done just before the WRITESWCH, and another was done after the WRITESWCH. The before Query image, updated by the changes to be effected by the WRITESWCH, exactly matched the after Query image, so all is well.

CDO802I Unexpected results from the WRITESWCH command.

A WRITESWCH call was executed. A QUERY SWITCH was done just before the WRITESWCH, and another was done after the WRITESWCH. The before Query image, updated by the changes to be effected by the WRITESWCH, did not match the after Query image. This is followed by this set of lines (for example) for each port for which there is a discrepancy between the expected results and the "after" Query record:

| Director addr Port xx | |
|---|---|
| Bytes 1-20 | OK" xxxxxxxx ... xxxxxxxx |
| PDCM (21-52) | Expected:" xxxxxxxx xxxxxxxx ... xxxxxxxx Actual:" xxxxxxxx xxxxxxxx ... xxxxxxxx |
| Name (53-76) | OK" name |
| Bytes 77-80 | OK" xxxxxxxx |

Each part that matches is indicated by "OK"; for each part that does not match, both the expected result and the actual result are shown.

| | |
|---|---|
| CDO805E | Port xx is allowed to port yy while port yy is prohibited to port xx.<br>... or ... Port xx is prohibited to port yy while port yy is allowed to port xx. |

The Asymmetry test found a port for which prohibit/allow was not symmetric.

| | |
|---|---|
| CDO991I | Script errors were found in this test. |
| CDO994I | This test was not performed. |

The individual test was not performed because script errors were encountered.

| | |
|---|---|
| CDO992I | Script errors were found in other test(s). |
| CDO993I | The RunWithErrs program option is not turned on. |
| CDO994I | This test was not performed. |

Even though script errors were not found in this test, there were script errors in at least one other test, and the "RunWithErrors" program option was set to 0. The option can be changed by modifying the source code of the program.

Computer System

In general, computer system 10 may be implemented using any type of computing device, and may be implemented as part of the switched fabric network. Computer system 10 generally includes a processor, input/output (I/O), memory, and bus. The processor may comprise a single processing unit, or be distributed across one or more processing units in one or more locations, e.g., on a client and server. Memory may comprise any known type of data storage and/or transmission media, including magnetic media, optical media, random access memory (RAM), read-only memory (ROM), a data cache, a data object, etc. Moreover, memory 16 may reside at a single physical location, comprising one or more types of data storage, or be distributed across a plurality of physical systems in various forms.

I/O may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. The bus provides a communication link between each of the components in the computer system 10 and likewise may comprise any known type of transmission link, including electrical, optical, wireless, etc. Although not shown, additional components, such as cache memory, communication systems, system software, etc., may be incorporated into computer system 10.

Access to computer system 10 may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

It should be appreciated that the teachings of the present invention could be offered as a business method on a subscription or fee basis. For example, a computer system 10 comprising a director control system 16 could be created, maintained and/or deployed by a service provider that offers the functions described herein for customers. That is, a service provider could offer to provide switched fabric network management as described above.

It is understood that the systems, functions, mechanisms, methods, engines and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. In a further embodiment, part or all of the invention could be implemented in a distributed manner, e.g., over a network such as the Internet.

The present invention can also be embedded in a computer program product which comprises all the features enabling the implementation of the methods and functions described herein, and which—when loaded in a computer system—is able to carry out these methods and functions. Terms such as computer program, software program, program, program product, software, etc., in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A computerized director control system for controlling a plurality of directors in a switched fabric network including a plurality of redundant paths between the plurality of directors, comprising:

a script language processor for interpreting high-level statements and generating command functions understood by an application programming interface (API) associated with the switched fabric network, the switched fabric network including the plurality of directors and a plurality of components connected to the plurality of directors, wherein at least one of the plurality of components is connected to two distinct directors of the plurality of directors, wherein the command functions are generated based upon the high-level statements, and wherein the command functions include:

a query switch command for investigating whether other components exist beyond at least one of the plurality of directors, a query interface switch command, and a write switch command for altering the status of the at least one director, the altering of the status including turning the director on or off, and a display result command for displaying results only when an error occurs in the write switch command; and a system for generating an output in response to a set of command functions submitted to the switched fabric network.

2. The director control system of claim 1, wherein the high-level statements are written in a script language.

3. The director control system of claim 1, wherein the output comprises a log file containing every bit of data sent to or received from each director involved in a set of commands submitted to the switched fabric network.

4. The director control system of claim 1, wherein the output comprises a report of each of a plurality of tests performed in response to a set of commands submitted to the switched fabric network.

5. The director control system of claim 1, further comprising predefined command scripts for performing a set of predefined tests on the switched fabric network.

6. The director control system of claim 1, wherein the script language processor includes a component for processing a query switch statement, a query interface switch statement, and an asymmetric prohibit/allow condition statement.

7. The director control system of claim 1, wherein the script language processor includes a component for processing a mask statement that causes a dynamic mask function associated with the write switch command to manipulate a port associated with a director.

8. A computer program product stored on a non-transitory computer readable medium for controlling a plurality of directors in a switched fabric network including a plurality of redundant paths between the plurality of directors, comprising:

program code for interpreting high-level statements and generating command functions understood by an application programming interface (API) associated with the switched fabric network, the switched fabric network including the plurality of directors and a plurality of components connected to the plurality of directors, wherein at least one of the plurality of components is connected to two distinct directors of the plurality of directors, wherein the command functions are generated based upon the high-level statements, and wherein the command functions include:

a query switch command for investigating whether other components exist beyond at least one of the plurality of directors, a query interface switch command, and a write switch command for altering the status of the at least one director, the altering of the status including turning the director on or off, and a display result command for displaying results only when an error occurs in the write switch command; and program code for generating an output in response to a set of command functions submitted to the switched fabric network.

9. The computer program product of claim 8, wherein the high-level statements are written in a script language.

10. The computer program product of claim 8, wherein the output comprises a log file containing every bit of data sent to or received from each director involved in a set of commands submitted to the switched fabric network.

11. The computer program product of claim 8, wherein the output comprises a report of each of a plurality of tests performed in response to a set of commands submitted to the switched fabric network.

12. The computer program product of claim 8, wherein the script language processor includes a component for processing a query switch statement, a query interface switch statement, and an asymmetric prohibit/allow condition statement.

13. The computer program product of claim 8, wherein the script language processor includes a component for processing a mask statement that causes a dynamic mask function associated with the write switch command to manipulate a port associated with a director.

14. A method of controlling a plurality of directors in a switched fabric network including a plurality of redundant paths between the plurality of directors, comprising:

providing a set of high-level statements for controlling at least one node in the switched fabric network;

processing the high-level statements and generating command functions understood by an application programming interface (API) associated with the switched fabric network, the switched fabric network including the plurality of directors and a plurality of components connected to the plurality of directors, wherein at least one of the plurality of components is connected to two distinct directors of the plurality of directors, wherein the command functions are generated based upon the high-level statements, and wherein the command functions are selected from the group consisting of:

a query switch command for investigating whether other components exist beyond at least one of the plurality of directors, a query interface switch command, and a write switch command for altering the status of the at least one director, the altering of the status including turning the director on or off, and a display result command for displaying results only when an error occurs in the write switch command;

submitting the command functions to the switched fabric network via the API; and generating an output in response to the command functions submitted to the switched fabric network.

15. The method of claim 14, wherein the high-level statements are written in a script language.

16. The method of claim 14, wherein the output comprises a log file containing every bit of data sent to or received from each director involved in the command functions submitted to the switched fabric network.

17. The method of claim 14, wherein the output comprises a report of each of a plurality of tests performed in response to a set of commands submitted to the switched fabric network.

18. The method of claim 14, wherein the providing includes selecting a predefined script for performing a set of predefined tests on the switched fabric network.

19. The method of claim 14, wherein the processing includes processing a query switch statement, a query interface switch statement, or an asymmetric prohibit/allow condition statement.

20. The method of claim 14, wherein the processing includes processing a mask statement that causes a dynamic mask function associated with the write switch command to manipulate a port associated with a director.

21. A method for deploying a director control system for controlling a plurality of directors in a switched fabric network including a plurality of redundant paths between the plurality of directors, comprising:

providing a computer infrastructure being operable to:

interpret high-level statements and generate command functions understood by an application programming interface (API) associated with the switched fabric network, the switched fabric network including the plurality of directors and a plurality of components connected to the plurality of directors, wherein at least one of the plurality of components is connected to two distinct directors of the plurality of directors, wherein the command functions are generated based upon the high-level statements, and wherein the command functions include:

a query switch command for investigating whether other components exist beyond at least one of the plurality of directors, a query interface switch command, and a write switch command for altering the status of the at least one director, the altering of the status including turning the director on or off, and a display result command for displaying results only when an error occurs in the write switch command; and generate an output in response to a set of command functions submitted to the switched fabric network.

* * * * *